United States Patent [19]
Duchatellier

[11] 3,877,342
[45] Apr. 15, 1975

[54] CAGE NUTS
[75] Inventor: Bernard Charles Duchatellier, Paris, France
[73] Assignee: Rapid S.A., Paris, France
[22] Filed: Mar. 8, 1973
[21] Appl. No.: 339,249

[30]    Foreign Application Priority Data
        July 6, 1972    France ............................ 72.24524

[52] U.S. Cl. .................................................. 85/75
[51] Int. Cl. .......................................... F16b 13/04
[58] Field of Search ..................... 85/73, 74, 75, 66; 151/41.73, 41.76, 41.74

[56]            References Cited
            UNITED STATES PATENTS
    406,565   7/1889   Church ................................. 85/75
    3,398,496 8/1968   Mischke ......................... 151/41.75
    3,451,455 6/1969   Parkin ................................... 85/74

FOREIGN PATENTS OR APPLICATIONS
1,018,678  10/1952  France ................................. 85/73
1,134,769  12/1956  France ........................... 151/41.73

Primary Examiner—Edward C. Allen
Attorney, Agent, or Firm—Teagno & Toddy

[57]    ABSTRACT

A cage-nut for use with a wooden, composite fiberboard or chipboard panel having a blind bore therein. The cage-nut includes a stamped, one-piece cage adapted to receive a nut for relative axial movement therein while preventing rotational movement relative thereto. The cage includes means to prevent rotation of the cage relative to the blind bore upon insertion of the cage therein and also includes means responsive to axial movement of the caged nut corresponding to tightening of the nut on a complementary received threaded member to lock the cage both rotationally and axially within the blind bore.

4 Claims, 6 Drawing Figures

PATENTED APR 15 1975 3,877,342
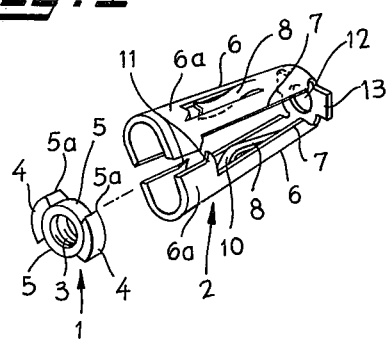
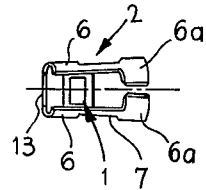
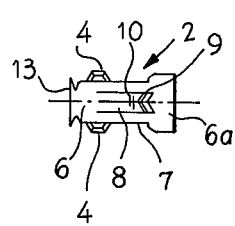
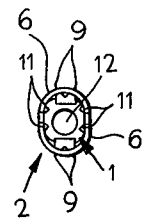
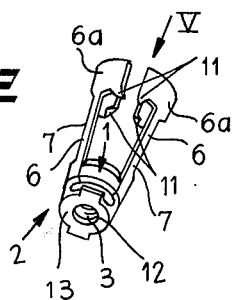
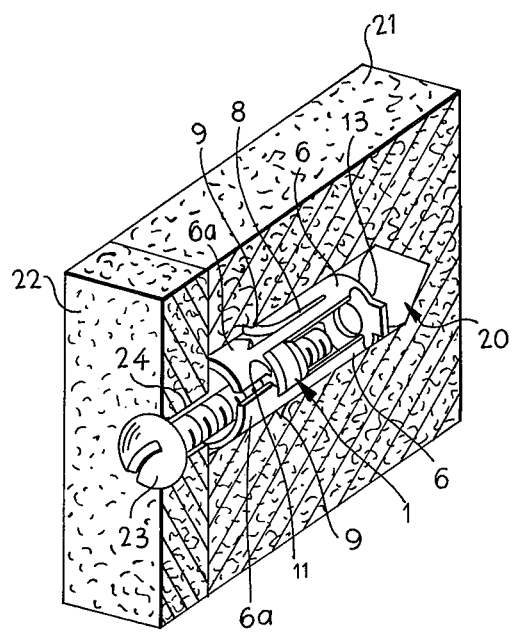

CAGE NUTS

BACKGROUND OF THE INVENTION

1. Field of the Invention

This invention relates to cage-nuts and more particularly to cage-nuts for use in panels having blind bores therein.

2. Description of the Prior Art

The prior art includes a variety of cage-nuts designed for use with relatively soft panels having blind bores therein. Such prior art devices have not been totally satisfactory as they tended to be relatively complicated and expensive structures to produce, they tended to require relatively elaborate procedures for the insertion and retention in the blind bores, they tended to shift axially with respect to the bore upon the application of an axial force and also they tended to rotate in the blind bores upon the application of torque to the caged nut. The prior art devices also were not totally satisfactory as once they did become rotationally and axially fixed within a bore they could only be removed with great damage to the cage-nut and the bore.

SUMMARY OF THE INVENTION

In accordance with the present invention, the drawbacks of the prior art have been overcome to the extent that a relatively simple and inexpensive cage-nut for use with soft panels having blind bores therein is provided which is easily installed, will not rotate in the blind bore, will become axially and rotationally locked in the bore upon tightening of the caged nut on a received complementary threaded member or screw and may be removed from the bore without undue damage to the bore. The above is accomplished by providing a one-piece, stamped metal cage, the cage including two arms of generally semicircular cross section which will be folded concave surface-to-concave surface to form a caged nut retaining cavity. The arms also define means which allow axial but prevent rotational movement of the caged nut relative to the cage. Means actuated by axial movement of the caged nut corresponding to tightening thereof will lock the cage both axially and rotationally to the inner walls of the blind bore. The cage also includes means on the inserted end thereof to prevent rotation of the cage relative to the blind bore and may include means on the opposite end of the cage to limit the insertion of the cage into the blind bore.

Accordingly, it is an object of the present invention to provide a new and improved cage-nut for use with relatively soft panels having blind bores therein.

Another object of the present invention is to provide a new and improved cage-nut for use with a panel having a blind bore which will automatically become axially and rotationally fixed to the bore in response to tightening of the caged nut upon a received complementary threaded member.

These and other objects and advantages of the present invention will become apparent from a reading of the description of the preferred embodiment taken in connection with the attached drawings.

BRIEF DESCRIPTION OF THE DRAWINGS

FIG. 1 is an exploded view of the cage-nut of the present invention showing the cage and the nut separately for illustrative purposes only.

FIG. 2 is a perspective view of the cage-nut of the present invention.

FIG. 3 is a side view of the cage-nut of the present invention.

FIG. 4 is a side view of the cage-nut of the present invention rotated 90° from the side view of FIG. 3.

FIG. 5 is an end view taken along the arrow V in FIG. 2.

FIG. 6 is a sectional view in perspective of the cage-nut of the present invention showing the cage-nut installed in a first panel to which a second panel is attached.

DESCRIPTION OF THE PREFERRED EMBODIMENT

The cage-nut of the present invention, which may be seen by reference to the drawings, includes two members, a caged nut 1 and a spring steel cage 2 which are shown separately for illustrative purposes only in FIG. 1. It is understood that the term blind bore is used to describe a bore which has easy access from one end only and thus through bores may fall within the scope of this invention.

As is well known in the art, caged nut 1 has an internal thread 3 as well as a periphery 4 fitted with two notches 5 or the like which are diametrically opposed. Notches 5 may be replaced by any manner of depression or extension and may be of any number and spacing as is well known in the art and, as will be explained below in greater detail, are used to prevent rotation of caged nut 1 within the cage 2.

Cage 2 as may be clearly seen in FIGS. 2 and 3, has a generally U-shaped cross section comprising two substantially identical legs 6 and a base 13. The two legs 6 are elastically deformable and generally semicircular in cross section. The legs are folded concave side-to-concave side to form a generally circular cavity in which caged nut 1 is received. The opposed edges of two legs 6 define a slotted section 7 extending axially along a portion of the length of the legs in which the periphery 4 of caged nut 1 is received as can be seen clearly in FIG. 4. It is, thus, understood that caged nut 1 is rotationally fixed with respect to cage 2 by means of the edges 5a of notches 5. It may also be seen that the caged nut 1 may freely move axially with respect to cage 2 along the axial extent of slots 7. As is well known in the art, various irregularities on the periphery of caged nut 1 may mate with corresponding irregularities on cage 2 to provide freedom of axial movement while restricting relative rotational movement.

Each leg 6 also has at least one small cutout tongue 8 which can project from the leg. The tongues 8, as is illustrated in FIG. 4, are generally rectangular in shape with each tongue being attached to the leg 6 at the end of the leg closest base 13 and with the free end of the tongue comprising a hook or tab 9. The tongues 8 are folded to project inwardly towards the inside of the U and into the caged nut receiving cavity. The tongues are also bent outwardly as at fold line 10 so that tab 9 will project outwardly from cage 2 when the tongues 8 are pushed radially outwardly from the inside of the cage. As the tongues project into the cavity at a point axially aligned with the ends of slots 7 nearest the free end of arms 6, the nut 1 will be resiliently biased toward the ends of slots 7 nearest the base 13.

The axial travel of caged nut 1 is limited to the axial extent of slots 7 as was discussed above. The axial extent of slots 7 are defined at one end by the base 13 and at the other end by stops 6a which are simply enlarged portions of legs 6 which extend towards the inside of the U as may be clearly seen by reference to FIGS. 1, 2 and 5. More specifically, it will be noted that it is the edges 11 of portion 6*a* that define the upper limits of slot 7.

As may be seen in the drawings, base 13 defines an aperture 12 through which a screw may pass and also includes at least a pair of diametrically opposed wings to prevent the rotation of the cage 1 within a blind bore as will be discussed in greater detail below. The free ends of the legs 6 may be plain allowing the cage-nut to be totally inserted in the bore or may include radially outwardly extending flanges to limit insertion as is well known in the art.

In operation, a blind bore 20 is formed within a panel 21 to which it is desired to attach an element 22 as may be seen in a perspective view by reference to FIG. 6. Into the blind bore 20 there is introduced, base end 13 first, the cage-nut which includes the caged nut 1. The initial assembly of the cage-nut of the present invention into a blind bore is made relatively simple because the tabs 9 on the unattached ends of tongues 8 will simply flex inwardly causing the tongues 8 to be pushed into the center of the U. It will be noted that the small wings on the end of the base 13 will to some extent prevent the rotation of the cage 2 within the bore 20. At this point of time, as an optional procedure, a tool may be introduced into the cage to force the tongues 8 outwardly of the cage and thus force the tabs 9 to dig into the internal surface of bore 20 causing the cage 2 to become axially and rotationally affixed thereto. If such a procedure is not deemed necessary, object 22 having a bore 24 therein is brought into engagement with panel 21 so that bores 24 and 20 are in alignment. Screw 23 is then placed through bore 24 and into bore 20 until it becomes threadably engaged with the caged nut 1. The screw is then rotated causing the caged nut 1 to move axially up the screw towards the head of the screw 23 and the surface 11 of stops 6*a*. As the nut moves toward the end of the slot defined by stop 6*a* the physical presence of the nut within that portion of the caged nut receiving cavity will cause tongues 8 to be forced outwardly from the caged nut thus causing the tabs 9 to lockingly engage the interior surface of bore 20. As the caged nut reaches the end of the slot 7 further tightening of screw 23 will cause the member 22 to be held tightly against panel 21 by the action of tension applied to screw 23 as is well known in the art. If it is desired to remove the cage-nut from bore 20, the screw 23 is rotated to disengage caged nut 1 which is or may be urged towards the end of slots 7 nearest the base 13. A tool may then be inserted to within the caged nut receiving cavity to hook tongues 8 and pull them into the cavity causing tabs 9 to disengage the bore.

Although this invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

I claim:

1. A cage-nut for use with a panel having a blind bore therein, said cage-nut comprising:

a one-piece generally U-shaped cage for insertion base end first into said bore, said cage comprising a base having an aperture therein and two generally semi-circular arms folded concave side-to-concave side to define a caged nut receiving cavity substantially coaxial with said aperture, said arms defining an axially extending pair of slots between the opposed edges of said arms along a portion of their axial extension, each arm having an axially extending tongue attached at the end closest the base, the free end of the tongue bent outwardly to form an outwardly extending barb and the portion of the tongue between the free end and the attached end being bent inwardly to extend into the caged nut receiving cavity at a point axially coincident with a portion of said axially extending slots, said base including a pair of radially outwardly extending wings thereon to prevent rotation of said cage in said bore; and a caged nut received in said caged nut receiving cavity, said caged nut having a pair of projections on the periphery thereof for receipt in and cooperation with said axially extending slots to allow axial movement of said nut along said axially extending slots while rotationally fixing said nut to said cage, said tongues biasing said caged nut to the axial portion of said slots closest said base, said nut upon axial movement in said slot towards the free ends of said arms being effective to force said tongues out of said cavity and to force said outwardly extending barbs into said blind bore.

2. The cage-nut of claim 1 wherein said slots are defined by the spaced edges of said arms, each arm having an enlarged portion at the free end thereof which will extend towards the other arm to define the axial boundary of sid slots.

3. The cage-nut of claim 2 wherein said barbs may be forced into said bore prior to movement of said nut by means of an object inserted into said caged nut receiving cavity.

4. The cage-nut of claim 1 wherein said tongue extends into said cavity at a point axially coincident with the portion of the slots nearest the free ends of the arms.

* * * * *